Oct. 9, 1973  C. C. RIPLEY  3,764,471
NUCLEAR FUEL ASSEMBLY

Filed June 1, 1970  7 Sheets-Sheet 5

United States Patent Office 3,764,471
Patented Oct. 9, 1973

3,764,471
NUCLEAR FUEL ASSEMBLY
Charles C. Ripley, San Jose, Calif., assignor to
General Electric Company
Filed June 1, 1970, Ser. No. 41,848
Int. Cl. G21c 3/34
U.S. Cl. 176—78                                    18 Claims

ABSTRACT OF THE DISCLOSURE

A fuel assembly containing nuclear fuel rods in spaced array comprising a tubular coolant flow channel and fuel rod spacer assemblies formed of cross-laced beams supported directly by the flow channel.

BACKGROUND

Typical fuel assemblies or bundles for a nuclear reactor core comprise an array of spaced fuel rods or elements contained in a tubular coolant flow channel. The fuel rods ordinarily are quite long compared to their diameters; therefore, one or more spacers usually are provided to present bowing the fuel rods and to maintain them in the desired array.

Such spacers are subject to conflicting design objectives. The spacer must have sufficient strength to limit fuel rod bowing and vibration and to resist severe thermal and hydraulic forces. It must provide sufficient contact area with the fuel rods to minimize local fretting damage to the fuel rod cladding at the points of contact. It must accommodate fuel rod swelling and it must allow fuel rod insertion without damage.

On the other hand, the spacer should require a minimum of material to minimize parasitic neutron absorption. It should be designed to minimize restriction of coolant flow through the channel and it should be adapted to fabrication from low-neutron absorption materials, such as zirconium and stainless steel, which are difficult to fabricate in complex shapes. It should be structurally adequate without dependence upon critical processes such as welds.

Many types and designs of fuel rod spacers have been proposed. For example, a spacer described in U.S. Pat. No. 3,350,275 has been used successfully in water cooled commercial reactors having fuel bundles in the order of 49 fuel rods of a diameter of about 0.5 inch and a length of about 12 feet. Such a spacer comprises an egg-crate like arrangement of dividers supported by a peripheral band and separate springs to maintain the fuels rods in position and to accommodate fuel rod expansion.

Such prior spaced designs are not well-suited for use, for example, in fast breeder type reactors wherein each fuel bundle may contain as many as 750 closely spaced fuel rods of 0.25 inch or less in diameter. In such a bundle there is insufficient room for separate springs of practical and reliable design. It is also desirable to eliminate the peripheral support band since it is a large percentage of the material of the prior spacers. Furthermore, such a peripheral support band occupies excess space, requiring a flow channel of larger cross section area, and it is detrimental to proper temperature and flow distribution of the coolant in the flow channel. In some cases supplemental channel lining material may be required to reduce excess flow area between such spacers.

SUMMARY

It is an object of the invention to provide a fuel assembly and a spacer arrangement especially adapted to accommodate closely spaced fuel rods of small diameter.

Another object of the invention is to provide a fuel rod spacer arrangement which does not require a peripheral support band.

Another object is to provide a spacer arrangement which does not depend upon welds or other critical processes for spacer integrity.

Another object is to provide a fuel rod spacer arrangement providing an optimum balance of strength and low parasitic neutron absorption.

Another object is to provide a spacer arrangement which minimizes restriction of coolant flow through the flow channel.

Still another object is to provide a spacer arrangement which is simple and inexpensive to fabricate.

These and other objects are accomplished in accordance with the invention by a plurality of spaced, cross-laced spacer beams forming fuel rod passages. Each of the beams is formed with an extending tab at each end adapted to engage a recess in the form of a pocket or an aperture or the like formed in the flow channel wall whereby the need for a peripheral spacer support band is eliminated. The beams are formed with a generally "W" shape in cross section to provide suitable fuel rod contacting surfaces and to provide a desired degree of resiliency to accommodate fuel rod expansion.

Advantageously, the crossed beams may be fused, as by welding, at their intersections to facilitate insertion of the beam assembly into the flow channel. However, it is a feature of the invention that the integrity of the spacer arrangement is not dependent upon such welds, the tabs at the beam ends being retained in engagement with the channel pockets by the presence of the fuel rods.

In an alternate form the tabs at the beam ends are elongated and formed with a bend to provide a laterally extending tip adapted to lock into the pockets or apertures in the channel wall.

In an alternate embodiment the ability of the spacer arrangement to reinforce the flow channel is utilized to reduce the thickness of the flow channel wall—thus reducing the amount of structural material in the core. Advantageously, the thin-walled channel is circumferentially corrugated in the zones between spacers. This provides lateral or circumferential stiffness while allowing longitudinal expansion and contraction of the fuel assembly and a solution to the problem of bowing of channels due to differential nuclearly induced swelling. The inward corrugations also provide a discontinuous inner channel surface to potential contacts with fuel rods. The spacer beams may be fused to the thin-walled channel so as to act in tension to resist bulging of the flow channel from internal coolant pressure.

The invention is described more specifically hereinafter with reference to the accompanying drawing wherein:

FIG. 3b is a cross section end view of the spacer beam of FIG. 3a;

Figure 1:
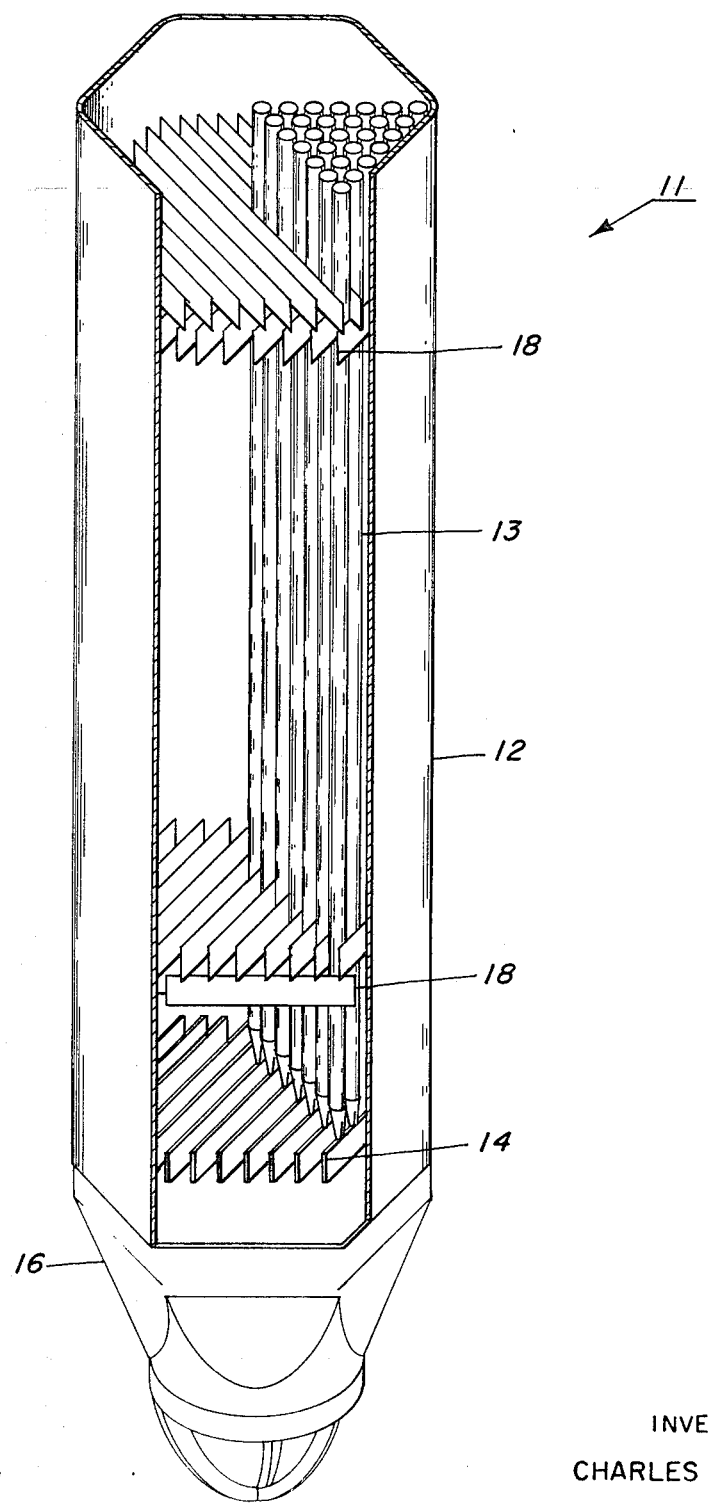
FIG. 1 is a perspective view, partly in section, of a fuel assembly of the invention.

Illustrated in FIG. 1 is a fuel assembly 11 comprising an open ended tubular flow channel 12 containing a plurality of elongated fuel rods 13. The fuel rods 13 extend through fuel rod passages 17 (FIG. 2) in a plurality of fuel rod spacer assemblies 18 which provide lateral support for the fuel rods. (The fuel rods 13 may be attached at their lower ends to a grid, indicated as 14, fixed in a coolant receiving nosepiece 16.)

Figure 2:
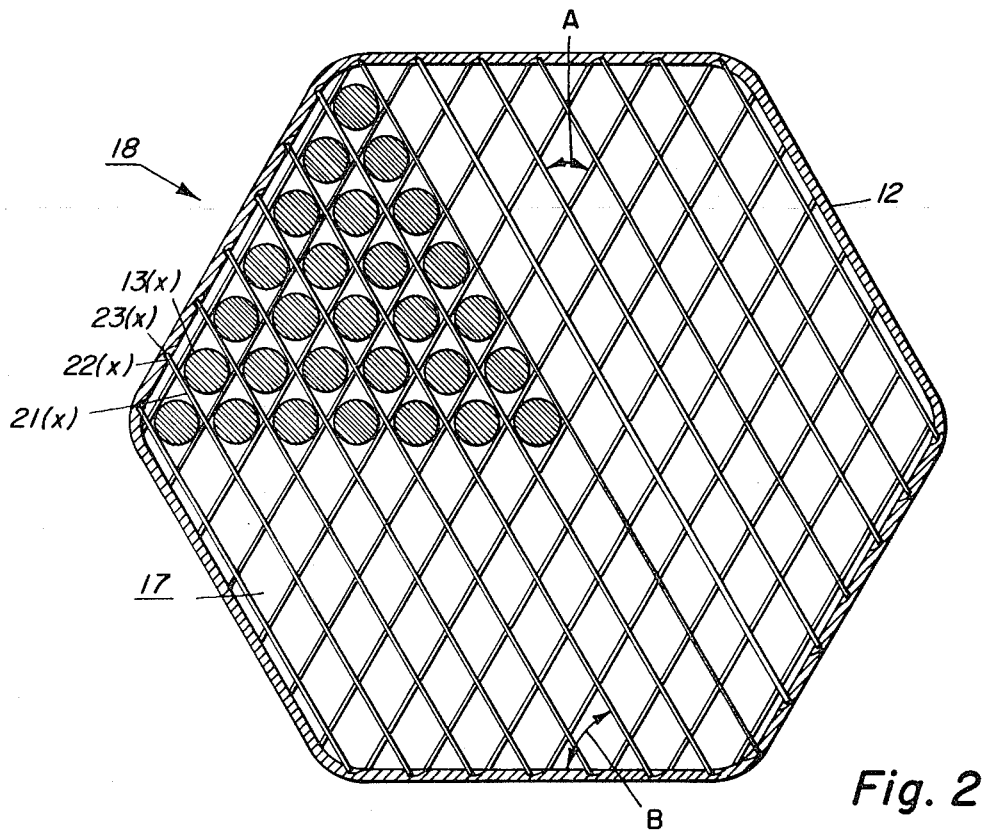
FIG. 2 is a plan view of a spacer assembly of the invention.
Figure 3A:
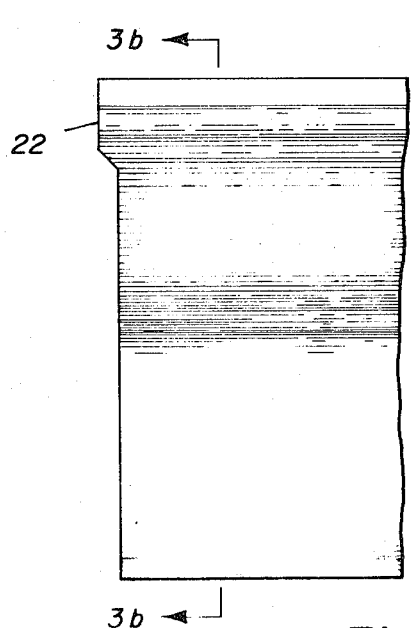
FIG. 3a is an enlarged side view of a spacer beam of the invention.
Figure 3B:
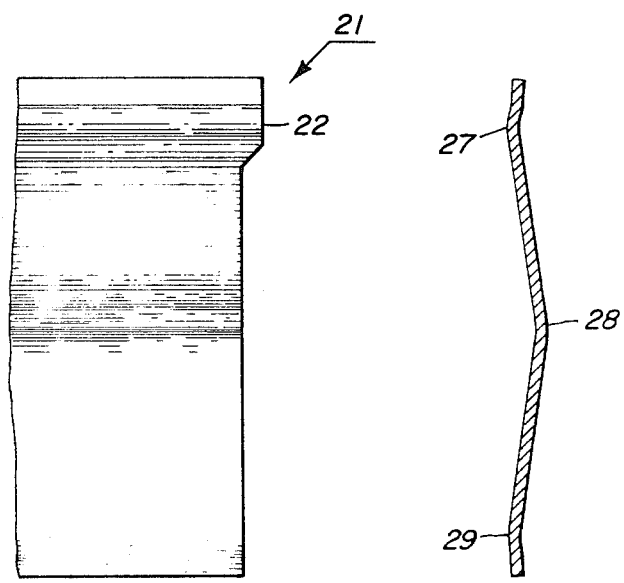
Figure 4:
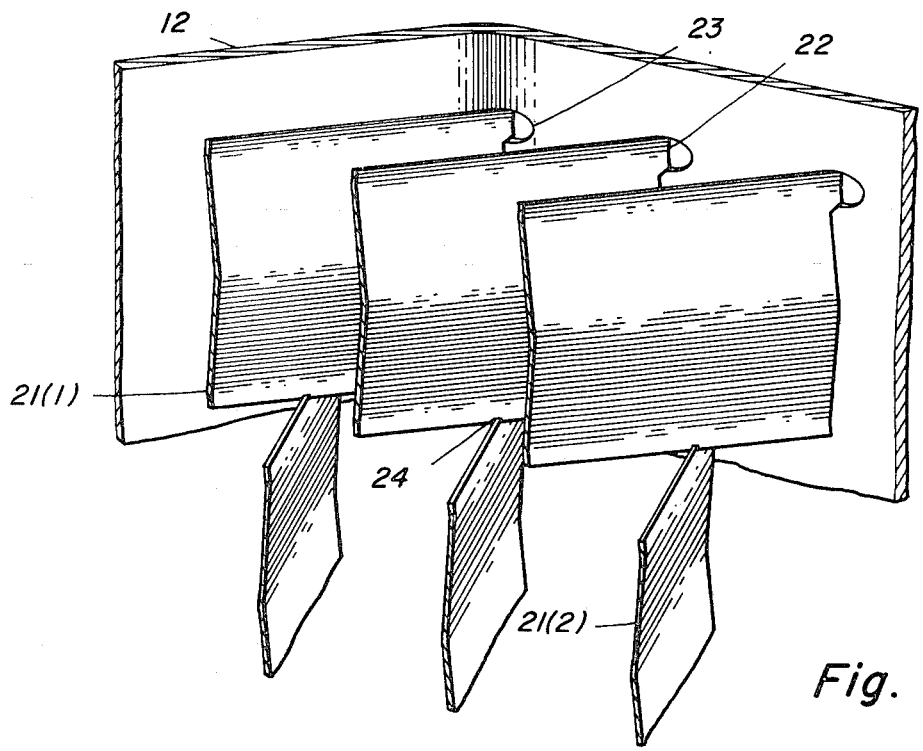
FIG. 4 is a detail view illustrating engagement of a beam tab with a pocket in the flow channel.
Figure 5:
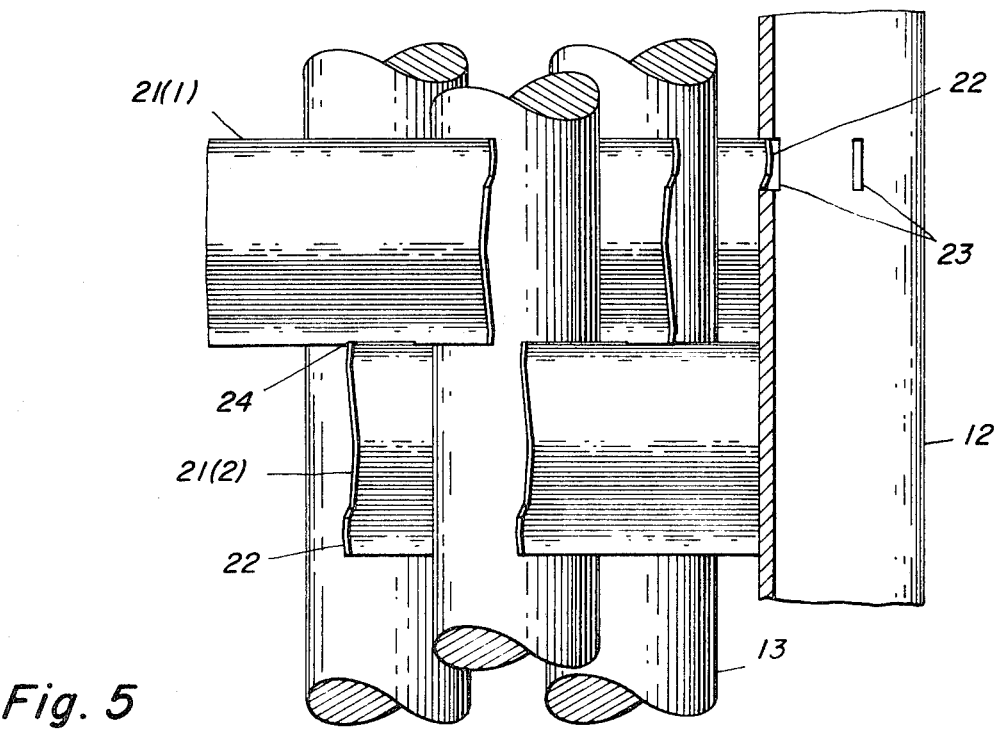
FIG. 5 is an enlarged detail view of a portion of the fuel assembly of FIG. 1.
Figure 9:
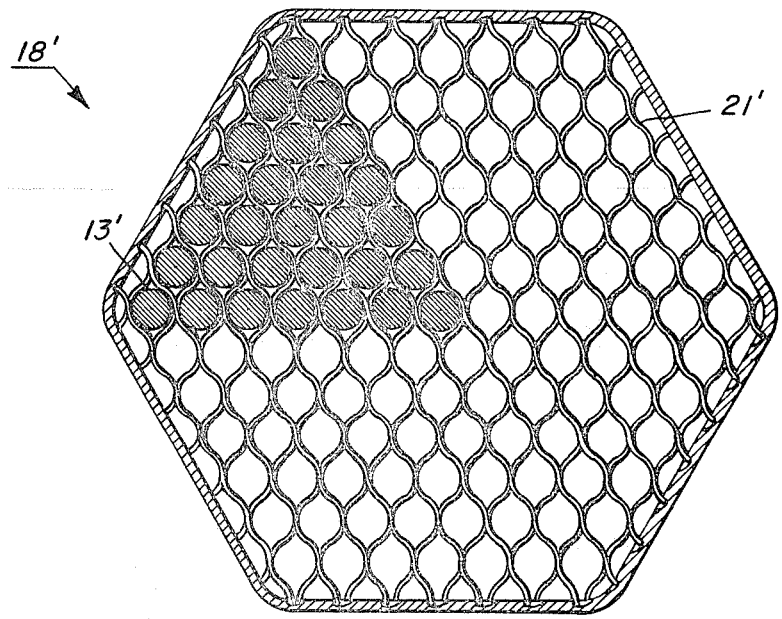
FIG. 9 is a plan view illustrating a spacer assembly having beams serpentine in longitudinal shape.

Details of the spacer assembly 18 are shown in plan view in FIG. 2 and in the detail view of FIGS. 3–5. The spacer assembly 18 is formed of a plurality of spaced cross-laced spacer beams 21, forming fuel rod passages 17, and including a plurality of spaced generally parallel upper beams 21(1) and a plurality of spaced generally parallel lower beams 21(2) extending at an angle A to the beams 21(1). The angle A depends upon several factors including the diameters of the fuel rods 13, the effective thickness of the spacer beams 21 and upon whether the beams 21 are longitudinally straight (as in FIG. 2) or are formed longitudinally serpentine in shape, as shown in FIG. 9 to accommodate closer fuel rod spacing. It is also arranged that the beams 21 meet the walls of the flow channel 12 at an angle B, for example, of 60°.

Each of the spacer beams 21 is formed with an extending tab 22 at each end thereof as best shown in FIG. 3a which is an elevation or side view of one of the beams 21. The tabs 22 are adapted to engage pockets or apertures 23 (FIGS. 4 and 5) formed in the wall of flow channel 12 at appropriate locations. The detail view of FIG. 4 illustrates the engagement of the tab 22 in a pocket 23 in a relatively thick-walled channel. As best shown in FIG. 5, the tabs 22 are located toward the upper edges of upper beams 21(1) and toward the lower edges of lower beams 21(2). This location of the tabs 22 enables insertion of the spacer assemblies 18 in the flow channel (as described hereinafter) and provides retention of the tabs 22 in the pockets 23 by the presence of the fuel rods 13. For example, as shown in FIG. 2, a tab 22(x) of an upper spacer beam 21(x) is retained in a pocket 23(x) by a fuel rod 13(x).

As best shown in FIG. 5 the upper and lower spacer beams 21(1) and 21(2) are welded together at their intersections 24. The welding process, described hereinafter, results in a small amount of interlocking or "eggcrating" of the beams at these intersections. It is an important feature of the invention that the structural integrity of the spacer arrangement does not depend on the welds at the intersections 24 or upon any welds. If any or all of the welds at the intersections 24 fail, the spacer beams 21 remain locked in position.

As shown in the cross section view of FIG. 3b, the spacer beams 21 are formed with a generally W-shaped cross section form. This shape accomplishes several purposes among which are providing smooth rounded surfaces 27, 28 and 29 for contact with the fuel rods 13 and a degree of resiliency across the apparent or effective thickness of the beam to accommodate fuel rod swelling and minor variation in fuel rod diameter.

As shown in FIG. 1, the angular orientation of the spacer assemblies 18 is progressively different along the length of the flow channel 12. For example, if the spacer assemblies are rotated sixty degrees to one another, a complete hexagonal constraint of each fuel rod is provided by every two spacer assemblies in the channel.

Figure 6:
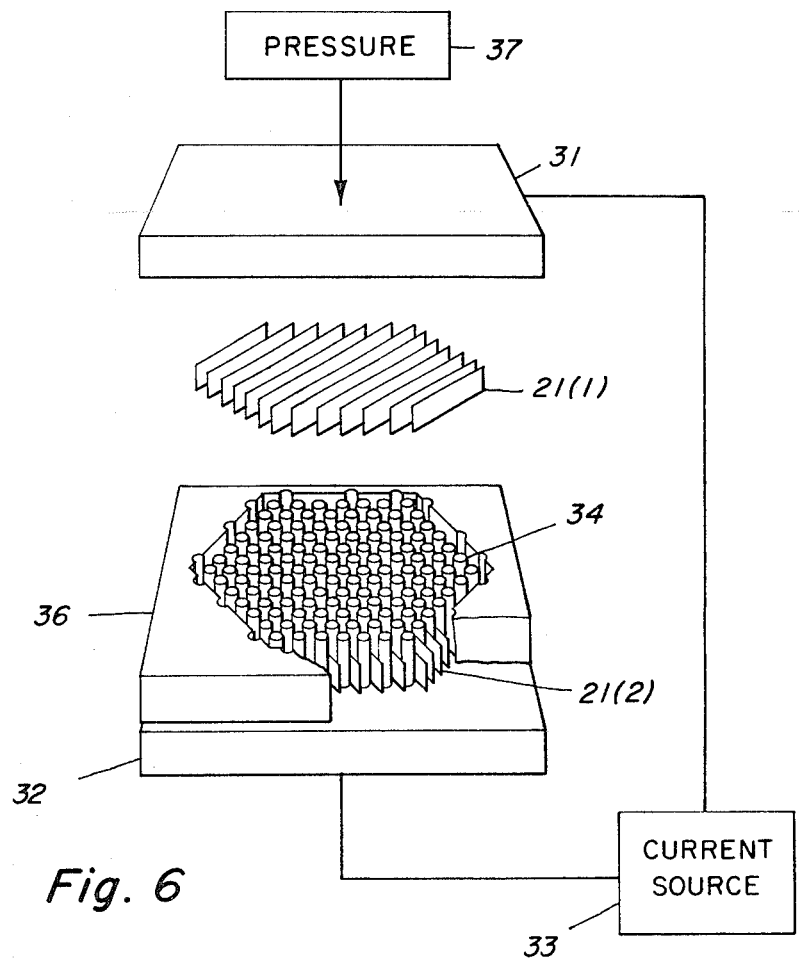
FIG. 6 is an exploded, partly schematic, illustration of an arrangement for assembling and welding the spacer assembly.

FIG. 6 is a partly schematic, exploded illustration of a fixture and apparatus for assembling and welding the intersections of the spacer assembly beams including upper and lower electrically conductive plates 31 and 32 connected to a source of electric current 33, and a plurality of pins 34 and a frame 36 both formed of electrically insulating material. The lower plate 32 is formed with a pattern of holes to receive and hold the pins 34 in a spaced array appropriate to receiving and holding the lower spacer beams 21(2) and the upper spacer beams 21(1) in their proper positions. The lengths of the pins 34 are such that they extend no more than flush with the surface of frame 36 and the thickness of frame 36 is a predetermined amount less than the unwelded stacked height of the upper and lower beams. To perform the welding of the beam intersections, the upper plate 31 is brought into contact with the upper beams 21(1) and a welding current is applied from upper plate 31, through the spacer beams and the beam intersections to the lower plate 32 with the result that all of the beam intersections are heated to welding temperature. Simultaneously, a predetermined pressure is applied between the upper and lower plates 31 and 32 from a source of pressure 37. The beam intersections are thus forced into one another during the welding process to form the slight amount of interlocking mentioned hereinabove.

Figure 7:
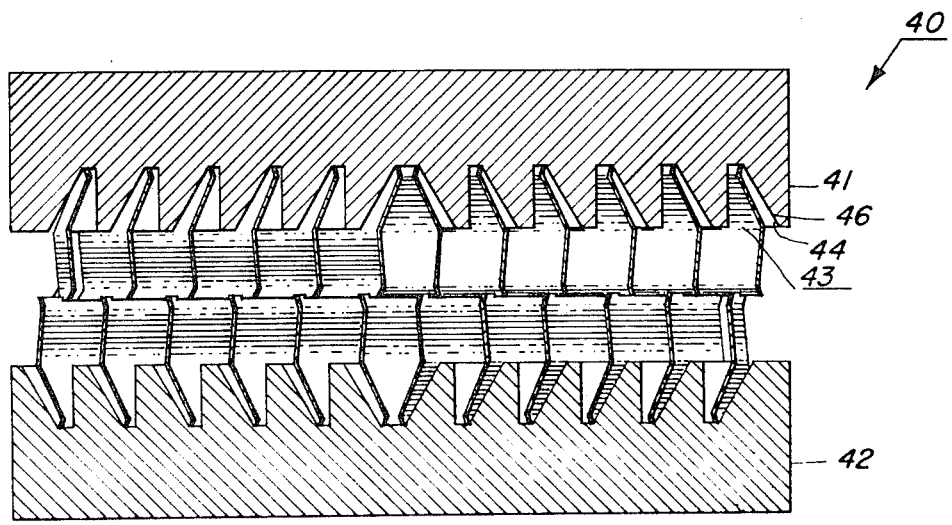
FIG. 7 is an elevation view illustrating a fixture for flexing the spacer beams.

After welding of the intersection (and removal from the welding fixture) the spacer assembly 18 is ready for installation in the flow channel 12. Such installation requires that the tabs 22 be held clear of the channel wall until the spacer beams are in position adjacent the respective tab receiving pockets 23. This may be accomplished by temporarily flexing the spacer beams toward the center of the spacer assembly and retaining the beams in this flexed position until the assembly is in its proper location in the flow channel. FIG. 7 illustrates a fixture 40 for achieving this purpose. The fixture 40 includes an upper plate 41 and a lower plate 42 each formed with a plurality of spaced grooves 43 having a saw-toothed shape. The grooves 43 are formed and spaced such that when the unflexed spacer assembly 18 is initially placed between the plates 41 and 42, the edges of the spacer beams 21 contact a point, such as point 44, at the beginning of the incline portion 34 of the groove 43. As the plates 41 and 42, with the spacer assembly 18 therebetween, are forced toward one another (by means not shown) the spacer beams 21 are flexed inward as their edges follow along the incline 46 to the bottom of the groove 43, as illustrated.

To retain the spacer beams in flexed position for insertion into the flow channel the assembly is cast in a casting wax such as polyethylene glycol while the assembly is held in its flexed position between the fixture plates 41 and 42. The plates 41 and 42 are then removed, the cast assembly is placed in position in the flow channel 12, and the wax is melted off by application of heat. Advantageously, polyethelene glycol is water soluble so that any residue may be washed off with water.

Figure 8:
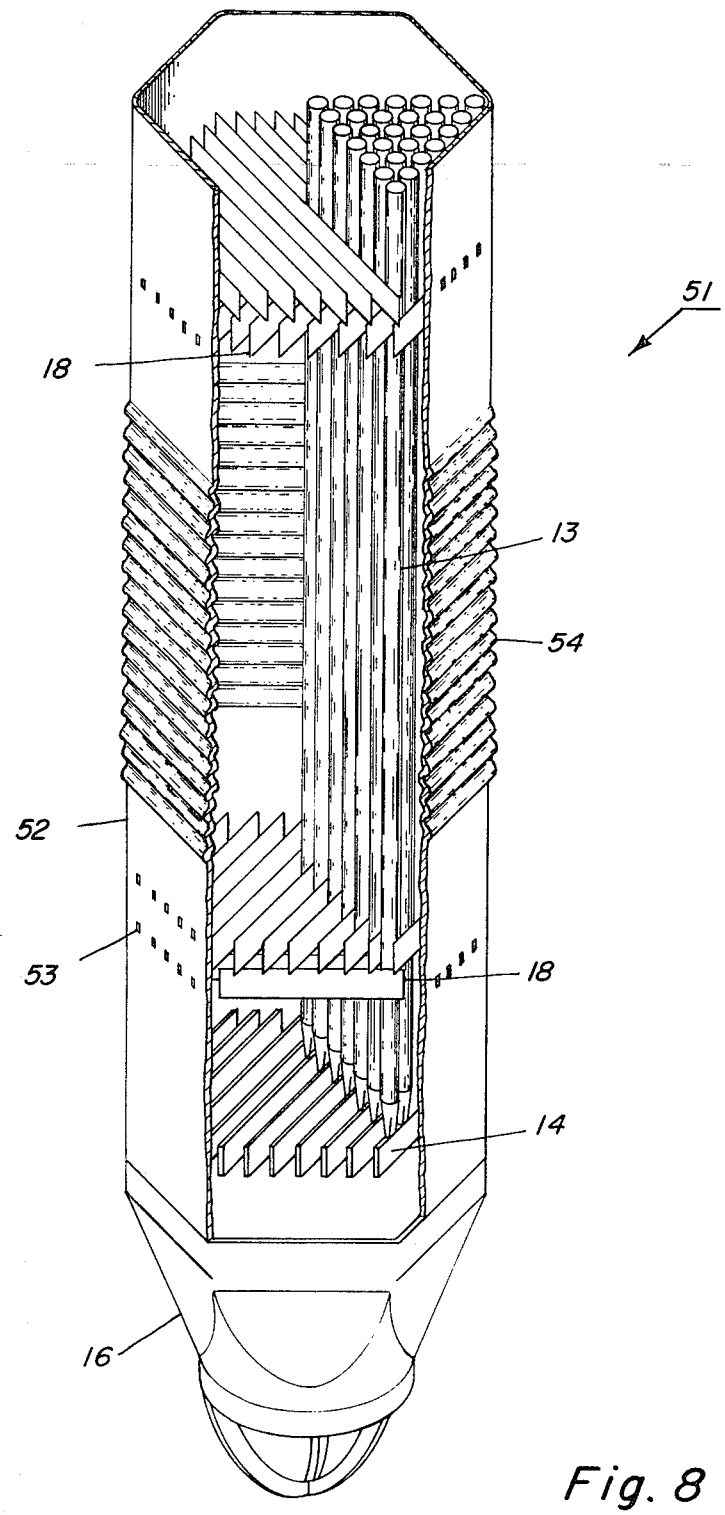
FIG. 8 illustrates a thin-walled embodiment of the invention.

A spacer reinforced thin-wall channel fuel assembly 51 is illustrated in FIG. 8. In this embodiment a flow channel 52 is formed of relatively thin material to reduce the amount of structural material in the core. The tabs 22 of the beams of the spacer assemblies 18 engage apertures 53 in the channel wall and these tabs are staked, welded or otherwise fixed in the apertures 53 so that the spacer beams may function in tension to resist bowing of the channel walls. In the zones between the spacer assemblies 18, the flow channel 52 is formed with lateral or circumferential corrugations 54 to provide lateral stiffness against bulging and bowing. The inward corrugations also provide a discontinuous inner channel surface which aids in preventing coolant starvation in the event a fuel rod blows out against the inner surface of the flow channel. Since the spacer assemblies 18 will support lateral compressive loads, the fuel assembly 51 may be clamped in the core by clamping forces applied at the spacer assembly locations. As in the embodiment of FIG. 1, the spacer assemblies 18 are rotated sixty degrees to one another along the length of the flow channel.

The plan view of FIG. 9 illustrates a spacer assembly 18' formed of spacer beams 21' having a W-shaped cross section (as in FIG. 3b) but also having a longitudinal serpentine shape. The spacer assembly 18' thus accommodates very closely spaced fuel rods 13'.

Figure 10:
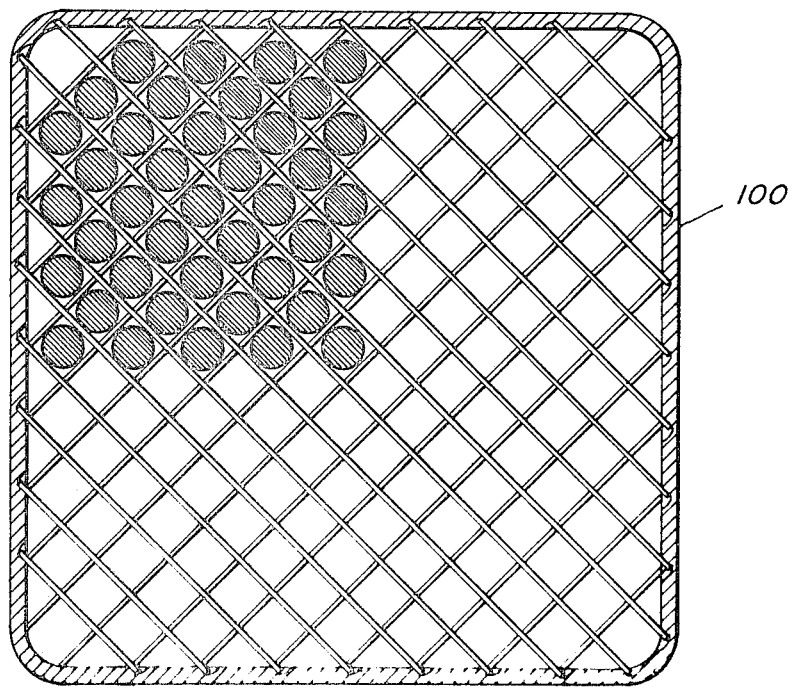
FIG. 10 is a plan view of a spacer assembly of the invention employed in a flow channel of square cross section.
Figure 11:
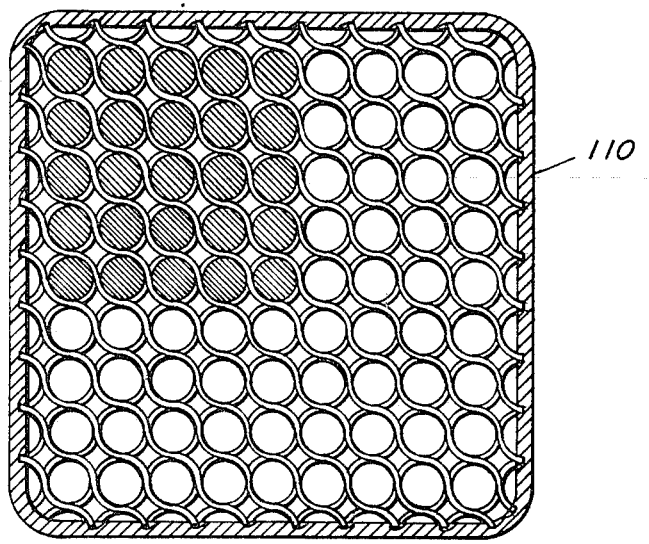
FIG. 11 is a plan view of a spacer assembly of beams having a serpentine longitudinal shape as employed in a flow channel of square cross section.

FIGS. 10 and 11 illustrate the use of spacer assemblies according to the invention in flow channels 100 and 110, respectively, of square cross section.

Figure 12:
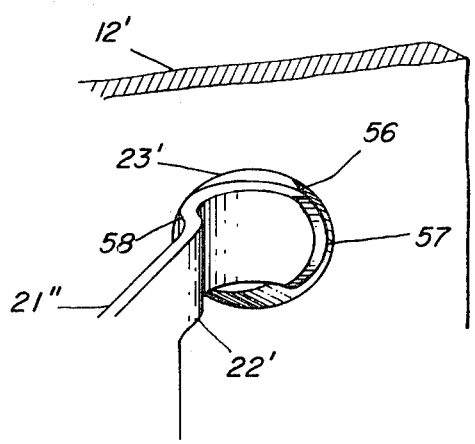
FIG. 12 illustrates a locking tab version of a spacer beam of the invention.
Figure 13:
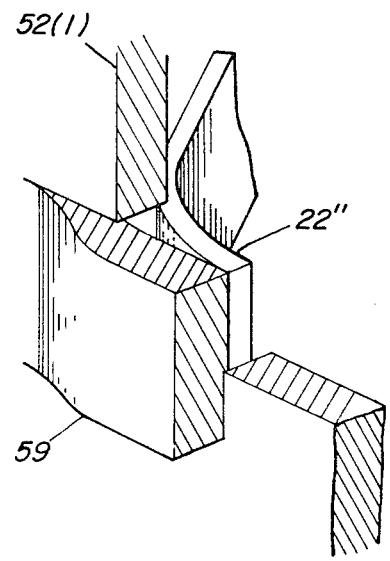
FIG. 13 illustrates the use of a locking tab spacer beam in a thin-walled flow channel.

FIGS. 12 and 13 illustrate a spacer beam 21" which is formed with a modified tab 22' adapted to lock mechanically into the flow channel wall. The locking tab 22' is formed with a lateral extension 56 having a tip 57. FIG. 12 illustrates the tab 22' engaging an aperture 23' in the wall of a flow channel 12', the tip 57 bearing against the side of the aperture 23' to thus lock the beam 21" in position. For use with a relatively thick-walled flow channel, the tab 22' may be formed with a heel 58 to engage the opposite side of the aperture 23' and provide a limited amount of entry of the tab into the aperture.

FIG. 13 illustrates the use of a locking tab 22" with a thin walled flow channel 52(1). In the case it is preferable to form a louver 59, rather than an aperture, in the channel wall to receive the locking tab 22".

What is claimed is:

1. An assembly for retaining a plurality of fuel rods in spaced, substantially parallel array, comprising: a tubular channel surrounding said array and extending longitudinally a length at least equal to the length of said fuel rods; a fuel rod spacer in said channel including a first group of spaced beams extending laterally from one side to an opposite side of said channel, a second group of spaced beams extending laterally from one side to an opposite side of said channel at an angle to said first group of spaced beams to form a plurality of intersections with said first group of spaced beams, said first and second groups being in substantially different lateral planes, each of said beams being formed with an extending tab at each end, and tab-receiving recesses formed in the walls of said channel extending outward from the inside surface of said walls for receiving and engaging said tabs of said beams to retain said beams in position in said channel.

2. The assembly of claim 1 wherein said intersecting angle is about 60 degrees.

3. The assembly of claim 1 wherein said beams are formed with a curved cross section shape to provide curved surfaces contacting said fuel rods substantially at right angles thereto.

4. The assembly of claim 3 wherein said beams are formed with a generally W-shaped cross section providing one rounded fuel rod contact surface on one side of each beam and two rounded fuel rod contact surfaces on the other side of each beam.

5. The assembly of claim 1 wherein said walls of said channel are formed or relatively thin material and wherein said tabs are fixed to said walls.

6. The assembly of claim 1 wherein said first and second pluralities of beams are interlocked a fraction of their sections.

7. The assembly of claim 1 wherein said first and second pluralitys of beams are interlocked a fraction of their width at said intersections.

8. The assembly of claim 1 wherein said beams extends at an angle to the sides of said channel.

9. The assembly of claim 8 wherein the angle between said beams and the sides of said channel is about 60 degrees.

10. The assembly of claim 8 wherein the angle between said beams and the sides of said channel is about 45 degrees.

11. The assembly of claim 8 wherein said tabs have a width less than the width of said beams and wherein said tabs are formed toward the edges away from the adjacent edges of said first and second pluralities of spaced beams whereby insertion of fuel rods through said passages urges said tabs into and retains said tabs in said recesses.

12. The assembly of claim 1 wherein said channel contains two of said fuel rod spacers laterally rotated with respect to one another so that the beams of one spacer are nonparallel to the beams of the other spacer.

13. The assembly of claim 1 wherein said beams are formed with a serpentine shape along their length from one side to another side in said channel to provide close spacing of said fuel rods.

14. The assembly of claim 1 wherein said channel contains a plurality of said fuel rod spacers located at spaced positions within said channel, wherein said channel is formed of relatively thin material, and wherein the walls of said channel are formed with lateral corrugations in the zones between said spacers.

15. The assembly of claim 14 wherein said tabs are directly attached to said channel.

16. The assembly of claim 1 wherein said tabs are formed with a lateral extension and wherein said recesses are formed with a side for locking engagement with said extension.

17. The assembly of claim 16 wherein said recesses are formed by apertures in the wall of said channel.

18. The assembly of claim 16 wherein said recesses are formed by louvers in the wall of said channel.

References Cited

UNITED STATES PATENTS

| | | | |
|---|---|---|---|
| 3,281,327 | 10/1966 | Webs et al. | 176—78 X |
| 3,137,638 | 6/1964 | Kumpf et al. | 176—78 |
| 3,137,637 | 6/1964 | Elliott | 176—78 |

FOREIGN PATENTS

| | | | |
|---|---|---|---|
| 1,126,733 | 9/1968 | Great Britain | 176—78 |
| 459,380 | 6/1968 | Switzerland | 176—78 |
| 840,010 | 6/1960 | Great Britain | 176—76 |
| 1,090,535 | 11/1967 | Great Britain | 176—76 |
| 1,085,182 | 7/1965 | Great Britain | 176—78 |
| 625,250 | 3/1963 | Belgium | 176—78 |
| 1,085,976 | 7/1960 | Germany | 176—78 |
| 1,453,939 | 6/1965 | France | 176—78 |

CARL D. QUARFORTH, Primary Examiner

G. G. SOLYST, Assistant Examiner

U.S. Cl. X.R.

176—76

UNITED STATES PATENT OFFICE
CERTIFICATE OF CORRECTION

Patent No. 3,764,471    Dated 9 Oct. 1973

Inventor(s) C. C. Ripley

It is certified that error appears in the above-identified patent and that said Letters Patent are hereby corrected as shown below:

Column 1, line 22, "present" should be --prevent--; Column 1, line 22, after the word bowing insert --of--; Column 1, line 51, "spaced" should be --spacer--; Column 4, line 46, "34" should be --46--; Column 4, line 73, "blows" should be --bows--; Column 5, line 26, "the" should be --this--; Column 5, line 59, "or" should be --of--; Column 5, lines 62-63, "pluralities of beams are interlocked a fraction of their sections" should be --pluralities of beams are fused together at their intersections--.; Column 6, line 1, "pluralitys" should be --pluralities--.

Signed and sealed this 29th day of October 1974.

(SEAL)
Attest:

McCOY M. GIBSON JR.
Attesting Officer

C. MARSHALL DANN
Commissioner of Patents